United States Patent [19]

Grant

[11] Patent Number: 5,010,911

[45] Date of Patent: Apr. 30, 1991

[54] ELECTROMAGNETIC VALVE OPERATOR

[75] Inventor: Dale A. Grant, Marinette, Wis.

[73] Assignee: Wormald U.S., Inc., Marinette, Wis.

[21] Appl. No.: 451,734

[22] Filed: Dec. 15, 1989

[51] Int. Cl.$^5$ .................... F16K 31/08; H01F 7/08
[52] U.S. Cl. .................... 137/68.1; 222/5;
251/65; 251/68; 251/129.16; 335/234; 335/238
[58] Field of Search .................... 137/68.1; 169/61;
222/5; 251/65, 68, 129.16; 335/234, 238

[56] References Cited

U.S. PATENT DOCUMENTS

| | | |
|---|---|---|
| 4,072,918 | 2/1978 | Read, Jr. . |
| 4,083,187 | 4/1978 | Magashima .................... 137/68.1 X |
| 4,253,493 | 3/1981 | English .................... 335/234 X |
| 4,496,395 | 1/1985 | Croat . |
| 4,683,452 | 7/1987 | Henley . |

OTHER PUBLICATIONS

Magnequench, General Motors, 1987 (brochure).
Kogyosha Catalog Excerpts, 1983 or 1984.
Drawing No. X-32054, "Cocking Mechanism Assembly", The Ansul Company, Marinette, Wis. 54143, Jan. 17, 1977.

Primary Examiner—Gerald A. Michalsky
Attorney, Agent, or Firm—Morgan & Finnegan

[57] ABSTRACT

A bi-stable electromagnet operator having an armature plate which is held in a first position by a permanent magnet and in a second position by a spring. An electromagnet is provided to enable the armature plate to move from the first position to the second position. The magnet has high coercivity and therefore the permanent magnet and core of the electromagnet can be in close magnetic contact both when the armature is in the first position and in the second position. The high coercivity of the permanent magnet provides for sufficient flux flow to maintain magnetization when the armature plate is in the second position away from the permanent magnet. Typically, the permanent magnet comprises neodymium.

17 Claims, 3 Drawing Sheets

ELECTROMAGNETIC VALVE OPERATOR

BACKGROUND OF THE INVENTION

I. Field of the Invention

The present invention is directed to a bi-stable electromagnetic operator for a valve. More particularly, the present invention is directed to an electromagnetic device in which a permanent magnet is in close magnetic contact with the core of an electromagnet with the absence of a non-working air gap directly joining the pole ends of the magnet.

II. Discussion of References

U.S. Pat. No. 4,072,918, incorporated by reference, discloses a bi-stable electromagnetic actuator which employs a non-working air gap to maintain a flux path of a predetermined maximum reluctance for a permanent magnet when an armature plate is in a first-stable position. A shunt piece separates the core of an electromagnet from the permanent magnet. The permanent magnet expressly disclosed is made of Alnico V as disclosed at column 5, lines 5-7. Alnico V material has a low coercive force compared to other magnets described below. Because of this low coercive force, the Alnico V material, as well as other ferrite magnets, needs a non-working air gap directly joining the pole ends of the magnet. Furthermore, the permanent magnet of U.S. Pat. No. 4,072,918 needs to be magnetized after assembly of the actuator. This is because the magnet needs to be encased in a highly magnetically permeable steel shell which conducts sufficient magnetic flux lines for the Alnico V material to remain magnetized. Air, not being as magnetically permeable as steel, would not conduct sufficient flux outside the structure. Because Alnico V needs to be magnetized after assembly, one needs a sufficiently strong magnetizer to overcome the tendency of the steel shell to direct the magnetic force of the magnetizer away from the material to be magnetized.

Rare earth-containing magnets of high coercivity have been developed. One example of such is high coercivity rare earth-iron magnets disclosed by U.S. Pat. No. 4,496,395 incorporated herein by reference. The rare earth materials are preferably praseodymium, neodymium and samarium. The magnets include an alloy of the rare earth material and iron. The magnets have higher magnetic coercivity than ferrite magnets. The rare earth-iron magnets have intrinsic room temperature coercivities of at least about 1,000 Oersteds and preferably at least about 5,000 Oersteds. Rare earth-containing magnets are also disclosed by U.S. Pat. Nos. 4,597,938, 4,601,875, 4,601,876, 4,684,406, 4,770,702, 4,770,723, 4,773,950, 4,792,368 which are incorporated herein by reference.

SUMMARY OF THE INVENTION

It is an object of the present invention to provide a bi-stable electromagnetic operator for a valve which employs a permanent magnet of high coercivity as well as an electromagnet.

It is a further object of the present invention to eliminate the necessity for having a non-working air gap and shunt between a permanent magnet and electromagnet core of a bi-stable operator.

It is a further object of the present invention to provide an electromagnetic bi-stable operator for a valve in which the permanent magnet is magnetized prior to insertion into the operator.

It is another object of the present invention to provide a bi-stable electromagnetic operator which can withstand a maximum applied voltage to operate voltage ratio of as much as about 100.

The present invention is a bi-stable electromagnetic operator that is typically employed with a valve. The operator comprises a permanent magnet which is in close magnetic contact with an electromagnet core. The magnet is sufficiently strong to hold an armature in place in a first position despite the force of a means for urging, such as a spring or a compressed air space or other equivalent means. Then by applying a voltage to a coil of the electromagnet of the correct polarity, the coil magnetic circuit forms an electromagnet. The magnetic lines of force created by the electromagnet negate the magnetic lines force of the permanent magnet and the armature moves to a second position when the spring force is greater than the holding force of the magnet attracting the armature. A magnet of high coercive force, at least 5,000 Oersteds, preferably at least 6,000 Oersteds, most preferably at least 10,000 Oersteds, is employed. Typically, the permanent magnets comprise neodymium.

The permanent magnet, due to its high coercive force, maintains sufficient magnetization that it will hold the armature in the first position (working position) when the armature is turned to the first position. The permanent magnet maintains the sufficient magnetization in the second position (non-working position) in spite of the fact that there is no shunt or non-working air gap joining the pole ends of the permanent magnet. The use of the magnetic material having high coercive force allows for simplified magnetic structure. The need for a safety air gap to protect the magnet from demagnetization is eliminated. Also, due to the material used to form the magnet, a high maximum-apply to operate-voltage ratio is gained along with the ability to charge the magnet before assembly. The operator is employed such that a valve is open when the actuator is in the first position and closed when the actuator is in the second position or vice versa.

DESCRIPTION OF THE PREFERRED EMBODIMENTS

Figure 1:
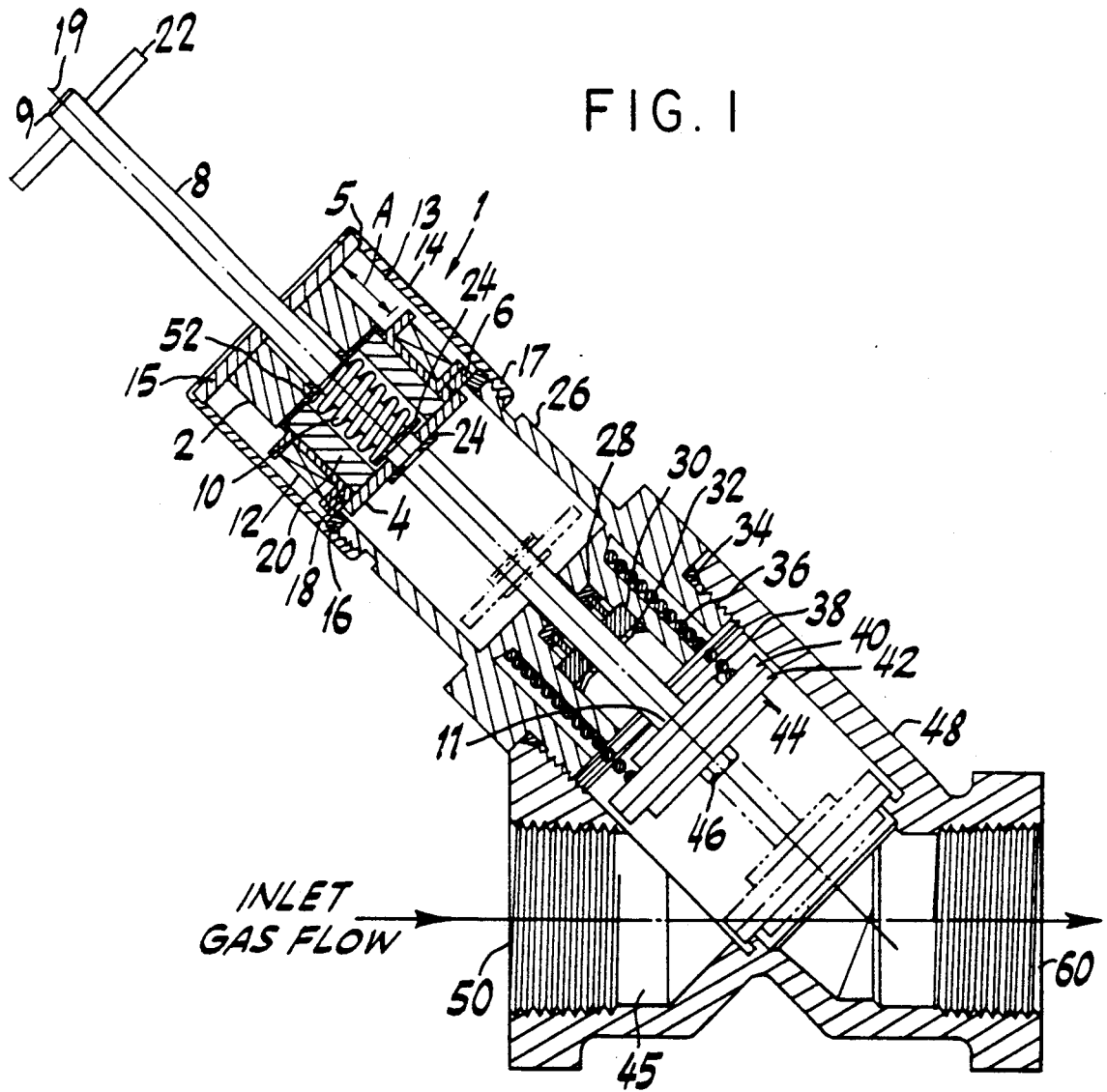
FIG. 1 shows a first embodiment of the present invention employed with a valve.

FIG. 1 shows a first embodiment of an operator 1 of the present invention. The operator 1 comprises a housing 14 having sidewalls 5 having an inner wall 13, a first end plate 15 attached to the sidewalls 5, a second open end 17 and a longitudinal axis 19. The housing 14 is made of magnetically permeable material. A magnet 2 is within the housing 14. The magnet 2 has an intrinsic room temperature magnetic coercivity of at least 5,000 Oersteds, preferably at least 6,000 Oersteds, and most preferably about 10,000 Oersteds to about 13,000 Oersteds. The magnet 2 is not a ferrite magnet. Typically, the magnet 2 is a combination of a rare earth element and iron. Examples of a suitable magnet are disclosed in U.S. Pat. Nos. 4,496,395, 4,597,938, 4,601,875, 4,601,876, 4,684,406, 4,770,702, 4,770,723, 4,773,950, and 4,792,368. Preferably, the magnet comprises one or more rare earth elements taken from the group of praseodymium, neodymium, and samarium. Most preferably the rare earth element is neodymium. The magnet 2 has a length "A" of about one to about four centimeters. A typical magnet is one-half inch (1.27 cm) long. Typically, the housing 14 is cylindrical and the magnet 2 is annular. The magnet 2 is axially aligned with the housing 14 along the longitudinal axis 19. The magnet 2 is in close magnetic contact with the first end plate 15. The magnet 2 is spaced from the inner wall 13. The magnet 2 is stationary within the housing 14.

A core 20 of magnetically permeable material is in close magnetic contact with the magnet 2. Typically, the core is made of iron and has a permeability of 700 to 1000 at a 5000 gauss level. The core 20 is substantially axially aligned with the longitudinal axis 19. A coil 12 is disposed about the core 20. An outer pole ring 6 and spacer ring 18 surround a portion of the core 20 which extends beyond the coil 12. The core 20 is in close magnetic contact with the magnet 2. Preferably the core 20 is adjacent the magnet 2 or merely separated by an alignment plate 52. A typical alignment plate 52 is about ⅛ inch to about 1/32 inch thick. Plate 52 is a mechanical means for aligning the magnet 2. The plate 52 is made of the same highly magnetically permeable material as the core 20 and pole ring 6. In actuality, plate 52 acts as an extension of core 20. The outer pole ring 6 is in close magnetic contact with the inner wall 13 of the housing 14. The spacer ring 18 forms a gap between an inner surface of the outer pole ring 6 and the core 20.

Figure 5:
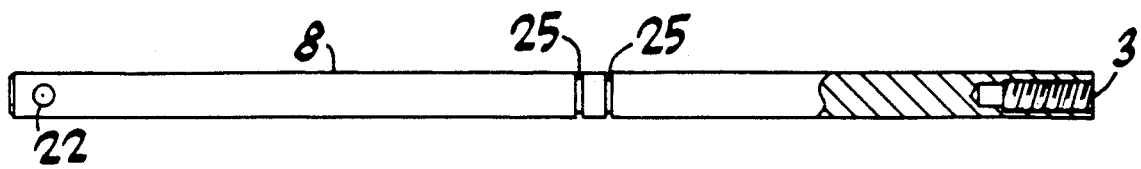
FIG. 5 discloses a rod from FIG. 1.

A rod 8 is movably located along the longitudinal axis 19 of the housing 14. The rod 8 has a first end 9 and a second end 11. The first end 9 has a pin 22 attached to it. An armature plate 4 is attached to the rod 8 by retaining rings 24. The rings 24 are held in groves 25 shown on FIG. 5. The armature plate 4 is of magnetically permeable material. The armature plate 4 is disposed for reciprocal movement from a first position, as shown in FIG. 1, and a second position, shown in phantom on FIG. 1, along the longitudinal axis 19. The armature plate 4 is disposed to overlie, in close magnetic contact, the core 20 and outer pole ring 6 when in the first position. When in the second position, the armature plate 4 forms a gap between itself and the core 20 and outer pole ring 6. The rod 8 is made of a material of low magnetic permeability, such as stainless steel, brass or aluminum, which have a permeability of about 1.

A spring 10 is provided within the core 20. The spring exerts a force which urges the armature plate 4 from the first to the second position. The spring 10 is optional when other urging means such as a spring 36 are provided. The combined force of the spring 10 and/or spring 36 must be at least about 35 pounds, preferably at least about 50 pounds. This force is necessary because typically the electromagnetic operator 1 is employed to control fluid (gas or liquid) flow and such fluid flow exerts pressure which must be overcome by the force of the spring 10 and/or spring 36.

A locking ring 16 is provided to hold the operator internals such as the core 20, etc. within the housing 14. The magnet 2 exerts sufficient flux to overcome the force of the spring 10 and/or spring 36 and hold the armature plate 4 in the first position in a stable manner.

An adaptor 26 is provided for coupling the operator 1 to a valve body 48. The adaptor 26 is screwed into the second end 17 of the housing 14.

The rod 8 extends through the adaptor 26. A seal 28 is provided for sealing the rod 8 to the adaptor 26. A guide 30 is provided to center the rod 8 and retain the seal 28. A retaining ring 32 holds guide 30 in place. An O-ring 34 is provided to seal the adaptor 26 to the valve body 48. The spring 36, described above, is provided to exert force on the rod 8 and thereby exert force on the armature plate 4. A guide 38 is provided to center spring 36 on the rod 8. A backing plate 40 is provided as a pressure plate for a sealing gasket 42. Gasket 42 is held in place by a retaining plate 44. A nut 46 holds retaining plate 44, gasket 42 and backing plate 40 in place. The nut 46 is screwed into a threaded opening 3 (shown on FIG. 5) of the second end 11 of the rod 8.

The valve body 48 is provided with a channel 45 having an inlet 50 and outlet 60. Gas flow through the channel 45 is shown. When armature plate 4 is in the first position, the channel 45 of the valve body 48 is open. When the armature plate 4 is in the second position, the channel 45 is closed because the sealing gasket 42 blocks fluid flow.

A typical use for the present invention is as an electric gas valve to control the flow of cooking gas. Current practice, in employing a prior art valve, is to control the flowing of cooking gas by continuously powering a solenoid coil to hold the valve in the open position. In an emergency (fire) condition, the electric power is interrupted to have the valve close thereby stopping the flow of gas. The problems encountered with the prior art approach are: continuous consumption of electrical power by the solenoid coil, additional circuit complexity to insure the valve does not open when the interrupting device is reset—this is normally accomplished with a reset relay arrangement, and nuisance trips (operation) caused by power burn-out spikes and glitches in the power source.

In contrast, the present invention would replace the prior art valve. Preferably, electrical operation of the present invention valve is achieved by applying a voltage of the correct polarity to the coil 12. Only operating on use of the correct polarity prevents accidental operation. The coil 12, sidewalls 5 of the housing 14, magnet 2, locking ring 16, armature plate 4, and outer pole ring 6 form a magnetic circuit thereby forming an electromagnet. The magnetic lines of force created by the electromagnet negate the magnetic lines of force of the magnet 2 and the valve operates (closes) when the force of the spring 10 and/or 36 is greater than the holding force of the magnet 2 attracting the armature plate 4. Thus the armature plate 4 moves to the second position.

In the second stable position, a second magnetic circuit is provided in the above-described structure. That magnetic circuit is from the magnet 2, to the core 20, jumps the gap formed by spacer ring 18, into pole ring 6, into the retaining ring 16, into the housing sidewalls 5, into the first end plate 15, and back into magnet 2.

In the first position the magnetic circuit is the same as that of the second position except that flux passes through the armature rather than across the gap formed by spacer ring 18. In essence, the gap across spacer ring 18 performs the function of both the working gap and non-working gap of U.S. Pat. No. 4,072,918.

When the armature plate 4 is in the second position, the armature plate 4 is separated from the core 20 and pole ring 6 by a sufficient distance such that the flux flow through the armature plate 4 is at a sufficiently reduced level, even after the current pulse to the coil 12 is terminated, that the net magnetic force on the armature plate 4 is less than the force of the spring 10 and/or spring 36. Thus the armature plate 4 is stable in the second position.

After the electromagnet is activated to move the armature plate 4 from the first to second position, the armature plate 4 may be returned to the first position either by a conventional mechanical device, not shown, or manually by pulling the pin 22 of the rod 8.

Preferably, the embodiment of the present invention, of FIG. 1, provides a polarized device that will operate with voltage applied in only one direction. This results in supervision without the chance of false operation. Furthermore, the embodiment provides non-powered operation in the normal open position of the valve and low power pulse operation to trip to the closed position. No safety air gap is required to protect the permanent magnet. Manual override operation and manual reset are possible.

In contrast to the present invention, when the armature plate of U.S. Pat. No. 4,072,918 moves from a first to a second position, the second position requires a non-working air gap to directly join the pole ends of the permanent magnet. Without the air gap a complete magnetic circuit could not form when the armature plate is in the second position because the magnet does not have sufficient coercive force.

In the present invention, the use of advanced magnetic material, such as neodymium-containing magnetic material, to form the magnet results in high coercive force which allows for simplified magnetic structure. The need for the non-working air gap of U.S. Pat. No. 4,072,918 is eliminated. Also, due to the material used to form the magnet, the present invention has a higher maximum-applied to operate-voltage ratio than does the operator of U.S. Pat. No. 4,072,918. Furthermore, the present invention, unlike the operator of U.S. Pat. No. 4,072,918, allows charging the magnet before assembly.

Figure 2:
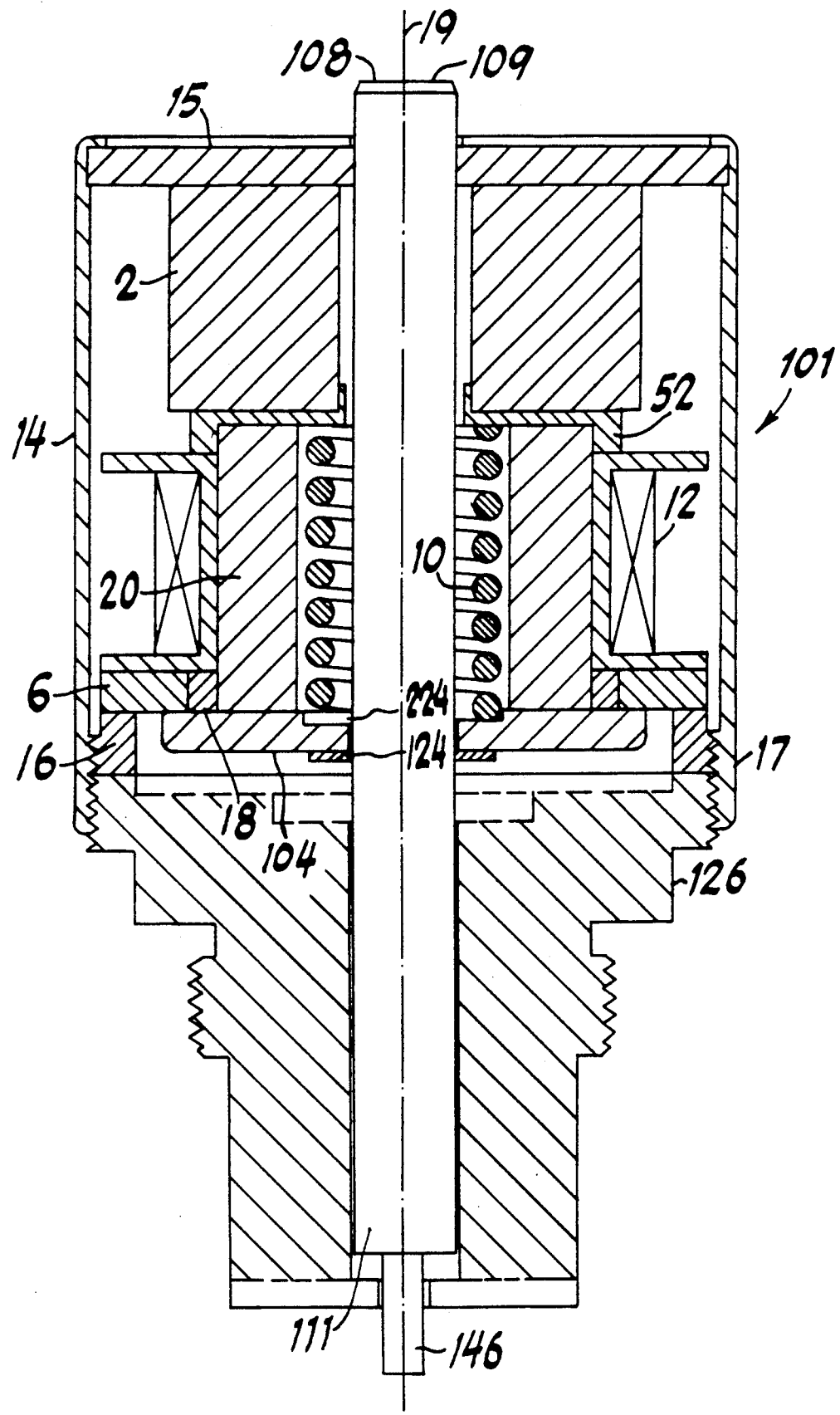
FIG. 2 discloses a second embodiment of the present invention.

FIG. 2 discloses a second embodiment of the present invention which employs an operator 101. Like elements in FIGS. 1 and 2 are labeled by the same numbers.

Figure 3:
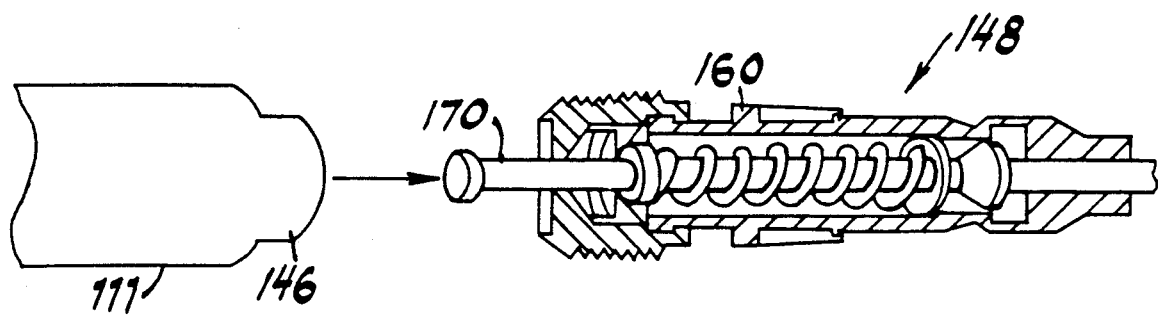
FIG. 3 discloses a schematic drawing of a Schrader valve.

Operator 101 has many of the same elements as operator 1 however operator 101 is provided with a rod 108, having a first end 109 and a second end 111, and an end piece 146 is screwed into a threaded opening (not shown) at the second end 111 of the rod 108. Rod 108 is provided with a retaining ring 124. An armature plate 104 has a notch 224. One end of the spring 10 sits in the notch 224. The end piece 146 is shaped to open a Schrader valve. An example of a Schrader valve 148 is schematically shown on FIG. 3. The valve 148 contains sidewalls 160 and a movable valve stem 170. When stem 170 is in a first position, as shown, the valve is closed. When the stem 170 is pushed to a second position, the valve is open. The end piece 146 would move the stem 170 to the second position. As shown in FIG. 2, the end piece 146 has a smaller cross sectional area perpendicular to the longitudinal axis of the rod 108 than does the second end 111.

The operator 101 is screwed into an adaptor 126 as shown in FIG. 2. The adaptor 126 typically allows 1 to 5 millimeters of movement by armature plate 4. This small amount of movement is typical to protect the Schrader valve from being overpushed and thereby damaged.

Figure 4:
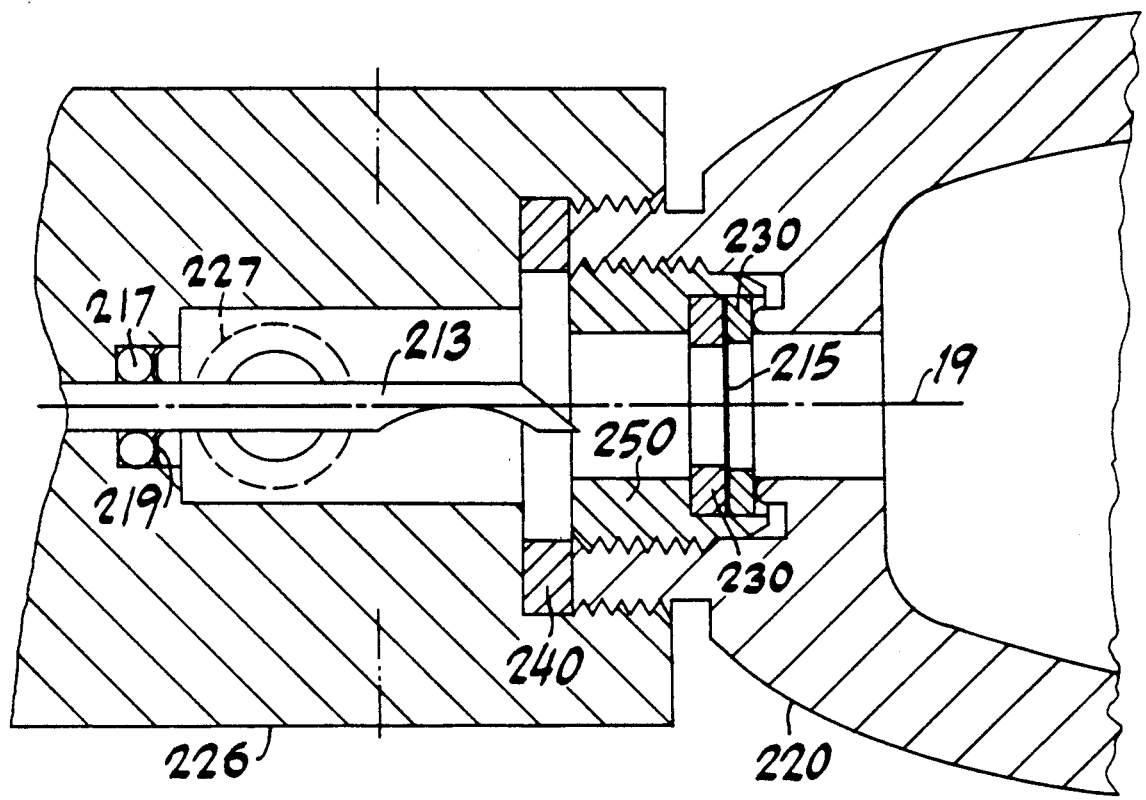
FIG. 4 discloses a puncture point for puncturing a frangible disc.

In a third embodiment of the present invention, rod 111 and end piece 146 of FIG. 2 are replaced with a puncture point 213 shown in FIG. 4. The puncture point 213 would be aligned with a frangible disk 215 which is held in place by washers 230. The frangible disk 215 would block the opening of a high pressure gas cartridge 220 or other channel of a container.

The puncture point 213 is located within an adaptor 226 which is attached (not shown) to the operator 101 and the gas cartridge 220. A typical use of the gas cartridge 220 is to contain halon for a fire extinguisher. The adaptor 226 is provided with an outlet port 227, an O-ring 217, and a retaining ring 219. The gas cartridge 220 is provided with a gasket 240, and a seal body 250.

The puncture point 213 is held away from the frangible disk 215 when the armature plate 4 is in the first position as shown. When the need arises, an electric pulse is passed into the core 12 thereby activating the electromagnet as discussed above. This moves the armature plate 4 from the first position to the second position. In the second position, the puncture point 213 pierces the frangible material 217 thereby opening the channel blocked off by the disk 215. In contrast to the amount of movement provided by the adaptor 126 in the case of the Schrader valve discussed above, the adaptor 126 may allow for a greater degree of movement of the armature plate 4 when employed with the puncture point 213.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended thereto.

I claim:

1. An electromagnetic operator apparatus comprising:
   a. a hollow housing of magnetically permeable material, having a longitudinal axis and an inner wall, said housing having a first end and a second end;
   b. a magnet having an intrinsic room temperature magnetic coercivity of at least about 5,000 Oersteds in close magnetic contact with said first end of said housing, and substantially axially aligned with said longitudinal axis, said magnet stationary within said housing;
   c. a coil;
   d. a core, of magnetically permeable material, substantially axially aligned with said longitudinal axis, at least a portion of said coil being disposed about said core and said core including a portion extending axially beyond said coil and away from said magnet;
   e. a pole piece, of magnetically permeable material, disposed adjacent said coil and about said portion of said core extending beyond said coil and away from said magnet, said pole piece in close magnetic contact with said inner wall of said housing and forming a gap, between an inner surface of said pole piece and said portion of said core;
   f. an armature, including an armature plate, of magnetically permeable material, disposed for reciprocal movement in said housing between first and second stable positions, along said longitudinal axis, said plate disposed to overlie, in close magnetic contact, said core and said pole piece in said first position, and to be spaced from said pole piece and said core in said second position;

g. means for urging said armature plate with a force of at least 35 pounds to said second position;

h. said magnet being sufficiently spaced from said inner wall and located in close magnetic contact with said core, for directing flux from said magnet through the entirety of said core prior to passing said flux into said inner wall when said armature is in said first position and when said armature is in said second position, said first position being a working position and said second position being a nonworking position;

i. whereby said magnet exerts sufficient flux to overcome said means for urging and to hold said armature in said first position when said armature has been returned to said first position after having been in said second position in spite of the close magnetic contact between said magnet and core, whereby said operator has no non-working gap to divert flux to said inner wall prior to the passing through said core.

2. The apparatus of claim 1, wherein said magnet comprises iron and at least one rare earth elements selected from neodymium, praseodymium and samarium.

3. The apparatus of claim 2, further comprising means for manually resetting the device from said second to said first position.

4. The apparatus of claim 2, wherein said magnet is adjacent said core.

5. The apparatus of claim 2, wherein said magnet and core are annular in form.

6. The apparatus of claim 5, wherein, said means for urging is disposed at least partially within said core.

7. The apparatus of claim 5, wherein said core and said magnet have end surfaces substantially coplanar with each other.

8. The apparatus of claim 7, wherein said armature comprises a rod of material of low magnetic permeability, means for connecting said rod to said armature plate, and means for substantially aligning said rod with said longitudinal axis of said housing for reciprocating movement therein.

9. The apparatus of claim 8, wherein said core and said pole piece have end surfaces substantially coplanar with each other, and substantially coplanar, and in close magnetic contact, with an end surface of said armature plate when said armature plate is in said first position.

10. The apparatus of claim 8, wherein intrinsic coercivity of said magnet is at least about 6,000 Oersteds and is about 1 to about 4 centimeters long.

11. The apparatus of claim 8, wherein said intrinsic coercivity is about 10,000 to about 13,000 Oersteds.

12. The apparatus of claim 11, wherein said magnet is about 1 to about 4 centimeters long.

13. The apparatus of claim 8, wherein said means for urging comprises a spring functionally connected to said rod.

14. The apparatus of claim 8, wherein said apparatus provides for manual override operation to move from said first to said second position and manual reset to move from said second to said first position.

15. The apparatus of claim 8, wherein said armature rod has a first end and a second end, further comprising an end piece attached to said rod second end, wherein the cross section of said end piece perpendicular to the longitudinal axis of said rod has less area than the cross section of said rod second end, and the distance from said first position to said second position is from 1 to 5 millimeters, whereby said armature rod is adapted to open a Schrader Valve in the second position.

16. A valve comprising,

A. means defining a channel;

B. an electromagnetic operator apparatus comprising:

a. a hollow housing of magnetically permeable material, having a longitudinal axis and an inner wall, said housing having a first end and a second end;

b. a magnet having an intrinsic room temperature magnetic coercivity of at least about 5,000 Oersteds in close magnetic contact with said first end of said housing, and substantially axially aligned with said longitudinal axis, said magnet stationary within said housing;

c. a coil;

d. a core, of magnetically permeable material, substantially axially aligned with said longitudinal axis, at least a portion of said coil being disposed about said core and said core including a portion extending axially beyond said coil and away from said magnet;

e. a pole piece, of magnetically permeable material, disposed adjacent said coil and about said portion of said core extending beyond said coil and away from said magnet, said pole piece in close magnetic contact with said inner wall of said housing and forming a gap, between an inner surface of said pole piece and said portion of said core;

f. an armature, including an armature plate, of magnetically permeable material, disposed for reciprocal movement in said housing between first and second stable positions, along said longitudinal axis, said plate disposed to overlie, in close magnetic contact, said core and said pole piece in said first position, and to be spaced from said pole piece and said core in said second position;

g. means for urging said armature plate with a force of at least 35 pounds to said second position;

h. said magnet being sufficiently spaced from said inner wall and located in close magnetic contact with said core, for directing flux from said magnet through the entirety of said core prior to passing said flux into said inner wall when said armature is in said first position and when said armature is in said second position, said first position being a working position and said second position being a non-working position;

i. whereby said magnet exerts sufficient flux to overcome said means for urging and to hold said armature in said first position when said armature has been returned to said first position after having been in said second position in spite of the close magnetic contact between said magnet and core, whereby said operator has no non-working gap to divert flux to said inner wall prior to passing said flux through said core;

C. wherein said armature comprises a rod of material of low magnetic permeability, means for connecting said rod to said armature plate, and means for substantially aligning said rod with said longitudinal axis of said housing for reciprocating movement therein, said core and said magnet have end surfaces substantially coplanar with each other, said magnet and core are annular in form, said magnet comprises iron and at least one rare earth element selected from neodymium, praseodymium and samarium, and an adaptor for coupling said housing to said means defining said channel, a frangible seal for blocking said channel, means for puncturing said seal, when said armature plate is in said second position, said puncturing means attached to said rod.

17. A valve containing,

A. means defining a channel;

B. an electromagnetic operator apparatus comprising:
   a. a hollow housing of magnetically permeable material, having a longitudinal axis and an inner wall, said housing having a first end and a second end;
   b. a magnet having an intrinsic room temperature magnetic coercivity of at least about 5,000 Oersteds in close magnetic contact with said first end of said housing, and substantially axially aligned with said longitudinal axis, said magnetic stationary within said housing;
   c. a coil;
   d. a core, of magnetically permeable material, substantially axially aligned with said longitudinal axis, at least a portion of said coil being disposed about said core and said core including a portion extending axially beyond said coil and away from said magnet;
   e. a pole piece, of magnetically permeable material, disposed adjacent said coil and about said portion of said core extending beyond said coil and away from said magnet, said pole piece in close magnetic contact with said inner wall of said housing and forming a gap, between an inner surface of said pole piece and said portion of said core;
   f. an armature, including an armature plate, of magnetically permeable material, disposed for reciprocal movement in said housing between first and second stable positions, along said longitudinal axis, said plate disposed to overlie, in close magnetic contact, said core and said pole piece in said first position, and to be spaced from said pole piece and said core in said second position;
   g. means for urging said armature place with a force of at least 35 pounds to said second position;
   h. said magnet being sufficiently spaced from said inner wall and located in close magnetic contact with said core, for directing flux from said magnet through the entirety of said core prior to passing said flux into said inner wall when said armature is in said first position and when said armature is in said second position, said first position being a working position and said second position begin a non-working position;
   i. whereby said magnet exerts sufficient flux to overcome said means for urging and to hold said armature in said first position when said armature has been returned to said first position after having been in said second position in spite of the close magnetic contact between said magnet and core, whereby said operator has no non-working gap to divert flux to said inner wall prior to passing said flux through said core;

C. wherein said armature comprises a rod of material of low magnetic permeability, means for connecting said rod to said armature plate, and means for substantially aligning said rod with said longitudinal axis of said housing for reciprocating movement therein, said core and said magnet have end surfaces substantially coplanar with each other, said magnet and core are annular in form, said magnet comprises iron and at least one rare earth element selected from neodymium, praseodymium and samarium, and an adaptor for coupling said housing to said means defining said channel, means for blocking said channel when said armature plate is in said second position, said means for blocking attached to said rod.

* * * * *